United States Patent Office 3,832,316
Patented Aug. 27, 1974

3,832,316
MELAMINE-DICYANDIAMIDE-BASE RESIN SOLUTIONS
Subhash C. Juneja, Ottawa, Ontario, Canada, assignor to Canadian Patents and Development Limited, Ottawa, Ontario, Canada
No Drawing. Filed June 1, 1972, Ser. No. 258,905
Int. Cl. C08g 51/24
U.S. Cl. 260—29.4 R                 5 Claims

ABSTRACT OF THE DISCLOSURE

Resin solutions suitable particularly for fire-retardant and adhesive applications are prepared from melamine, dicyandiamide, formaldehyde and an oxy-acid of phosphorus. The melamine and dicyandiamide are dissolved in a heated alkaline formaldehyde solution, the solution cooled, and the oxy-acid of phosphorus slowly added, resulting in clear solutions of long pot-life. Fire-retardant and adhesive properties are evaluated.

---

This invention includes new methods for the preparation of stabilized aqueous solutions of formaldehyde, melamine, and dicyandiamide incomplete reaction products and their applications as resins, adhesives or coatings, particularly for the treatment of wood and wood products so as to render them fire-retardant, and resistant to decay. The fire-retardant treatment consists of impregnating or coating wood and wood products by the stabilized aqueous solutions, followed by complete polymerization or thermosetting of the constituents of the treating solution. The wood and wood products treated in this manner exhibit the characteristics of leach-resistant fire-retardance, non-afterglow, and decay resistance. The treated products retain the original appearance of the wood. The stabilized aqueous treating solutions are characterized by their ease of preparation and application, and sufficiently long working, shelf, or pot life.

The more conventional methods of obtaining fire-retardancy, although quite effective, have several drawbacks such as leachability and unattractive appearance resulting from surface deposition of white crystalline salts (blooming) when the treated materials are subjected to varying humidity conditions.

Other methods such as those involving the use of tetrakis-(hydroxymethyl)-phosphonium chloride and tris-(1-aziridinyl)-phosphine oxide have not been economically acceptable due to their prohibitive costs. The bromination processes as disclosed by Lewin in U.S. Pat. 3,150,919 does not provide, for many applications, sufficient protection against glowing. Further this process may cause excessive embrittlement of the wood and may result in products having an unattractive appearance and is therefore not suited to wood veneers and wood finish products where the decorative appearance of the wood is an important criterion in its utilization.

Formulations based on melamine have been found to have a limited pot-life and in many cases refrigeration has had to be resorted to. Canadian Pat. 526,115 June 12, 1956, Burnell et al., describes a methylolated melamine-methylolated dicyandiamide fire-retardant formulation for textiles. The melamine (and preferably the dicyanadiamide also) is pre-reacted with formaldehyde before preparing the resin solution. With this type of formulation we have found the resin solution is not always clear and the pot-life is too limited, particularly for treatment of wood materials. Comparisons with this type of solution are discussed in detail below.

It has been our primary objective to provide an economical method for treating lumber and wood products such as shingles, shakes, particle board, veneers and plywood so that these would exhibit characteristics such as leach resistance, non-blooming, glow inhibition, flame-retardancy, and increased resistance to decay without altering the natural appearance of the original wood.

In accordance with one aspect of this invention, wood is impregnated with a stabilized aqueous solution of incompletely reacted formaldehyde, dicyandiamide and melamine, together with an oxy-acid of phosphorus. The impregnated products are dried and cured by heating to a temperature of about 50–105° C. depending upon the thickness and the end use of these materials.

The stabilized treating solution preferably comprises about 10 to 79 percent by weight of the incomplete reaction product of melamine, dicyandiamide, formaldehyde, and preferably pohsphoric acid (and about 21 to 90 percent by weight of water). Solutions containing less than about 10 percent by weight of the combined ingredients are impractical for the treatment of wood and wood products, whereas the solutions having a weight percent concentration of greater than about 79 percent are very viscous and usually prove unsuitable for the impregnation of wood and wood products. However more dilute (or more concentrated) solutions may be suitable for other uses e.g. adhesives, molding or casting etc. These stabilized solutions have been observed to have a working life of more than about two weeks depending upon the amounts of constituents used in their preparation. The ranges of composition of the reactants in the treating solutions and the methods of preparation are both important to the stability of the solutions.

The mole ratio of dicyandiamide to melamine in the stabilized treating solutions ranges from about 12:1 to 1:1; the mole ratio of combined melamine plus dicyandiamide, to the oxy-acid of phosphorus, varies from about 2:1 to 2:3; and that of the combined dicyandiamide plus melamine to formaldehyde from about 1:2 to 1:4.

Any mole ratio of the combined dicyandiamide plus melamine to phosphoric acid greater than about 2:1 is not desirable because it results in the treating solutions having a shorter working life and it also causes a reduction in fire-retardancy. A mole ratio of smaller than about 2:3 of the combined amines to the acid leads to serious discoloration of the treated products. A mole ratio of the combined amines to formaldehyde of less than about 1:4 results in the wastage of formaldehyde and exerts an adverse effect upon the fire-retardant effectiveness of the treating solution. However excess unreacted or "free" formaldehyde in the solution, preferably at least about 19%, by wt. of total reactants (excluding P acid) on preparation, is important for good stability. It has now been found important for good stability of the solutions that (a) the formaldehyde not be prereacted with the melamine or the dicyandiamide—leading to considerable free formaldehyde being initially present in the resin solution (i.e. at least about 7.5% wt. for up to about 30 minutes after preparation),
(b) the solution be cooled shortly after the disoslution of the melamine and discyandiamide is complete and kept cool i.e. below about 30° C. during addition of the oxy-acid of phosphorus, and
(c) the pH of the solution should fall on addtion of the acid to below about 1.3 to 1.5. The pH will rise on standing but it is important to start out with this low pH.

The oxy-acid of phosphorus may be any of the known forms such as $H_3PO_4$, $2H_3PO_4 \cdot H_2O$, $H_4P_2O_7$, $H_4P_2O_6$, $HPO_3$, the polyphosphoric acids, and mixtures thereof. A minor amount of other acids may be substituted for the P acid in some applications e.g. HCl, $H_3BO_3$, HBr, $H_3SbO_4$, $H_2SO_4$, HI, trichloroacetic acid etc. Desirably any other acid should bestow some fire-retardant properties.

The resin solution may optionally contain acidic salts such as ammonium phosphates and phosphites, ammonium or zinc halides and ammonium sulphates. For special applications wood preservatives, corrosion inhibitors, dispersants, or surfactants may be incorporated.

The invention includes the use of the resin solution as an adhesive especially for wood particle boards. On application as an adhesive a fast-cure rate can be important (and a minimization of released formaldehyde). The addition of polyfunctional amines or amides can increase the cure-rate (even at ambient temperatures). Up to about 5% wt. (based on total solids) of urea has been found very effective for this purpose.

PREPARATION OF THE TREATING SOLUTION

Typical examples showing suitable compositions of the reaction product in the stabilized solution are given below in Table 1. However it is to be understood that these examples are given by way of illustration and not of limitation.

TABLE 1.—TYPICAL COMPOSITION OF REACTION PRODUCTS

| Constituent | Moles of— | |
|---|---|---|
| | A | B |
| Melamine | 1 | 1 |
| Dicyandiamide | 3 | 9 |
| Formaldehyde | 12 | 30 |
| Phosphoric acid | 2–6 | 10 |

Methods by which the stabilized aqueous solutions (e.g. for the impregnation of the wood and wood products) with varying solids* concentrations can be prepared are illustrated.

In one typical example—composition A from Table 1—243 g. (3 moles) 37% formaldehyde solution and 135 mls. of water are mixed and the pH of the solution is adjusted to approximately 7.5–8.5 by adding a few drops of 3N NaOH. The solution is then heated to 80° C. At this point, a mixture of 31.5 g. (0.25 moles) of melamine and 63.0 g. (0.75 moles) of dicyandiamide are added slowly with constant stirring. After a few minutes of stirring, a clear solution is obtained. At this stage, the mixture is cooled to room or ambient temperature. This solution contains 20% melamine and dicyandiamide solids* on a weight/weight basis but can be diluted to any desired concentration with water. Phosphoric acid (85%) is added slowly to the solution containing a predetermined solids content so as to obtain a 1:0.75 to 2:3 mole ratio of the solids to acid and a pH of less than about 1.3. Solutions prepared in this manner have more than two weeks of working life.

In a second typical example, it was required to make 30 litres of solution having a solids* to acid molar ratio of 1:1. The solids* content was to be 7.5% on a weight by weight basis. For this purpose, the quantities of reagents as shown in Table 2 were used. The HCHO solution may be heated to 60–90° C.

TABLE 2

Solution constituents

| Constituent | Quantity |
|---|---|
| Melamine gms | 820 |
| Dicyandiamide gms | 1640 |
| 37% formaldehyde solution litres | 5.86 |
| Water do | 84 |
| 85% phosphoric acid do | 1.9 |

Water and formaldehyde were mixed and the pH of the resulting solution was adjusted to 7.5–8.5 by adding 3N NaOH. The solution was heated to 80° C. At this stage, premixed dicyandiamide and melamine were added and heated until dissolved. After complete dissolution, the solution was cooled by circulating cold water through a cooling coil immersed in the solution until it reached a temperature of about 30° C. Then phosphoric acid was added slowly in order to avoid rapid temperature increases. In this manner any solution with specified solids concentration can be prepared directly without dilution. These solutions have a working life of more than two weeks.

In a third typical example six solutions of varying total solids contents were made up by the technique just described using the mole ratios as in Table 1 under B. The solution's total solids content ranged from about 15 to about 61% by wt. At about 15% the useful pot life was about 18 weeks, and at about 20%, the pot life was extended to about 25 weeks. At four total solids contents from about 25% to 61%, the solutions still were clear and usable after 29 weeks.

EXAMPLES OF APPLICATIONS

The various methods by which different wood products can be treated for fire retardancy include:
1. Soaking,
2. Diffusion into green wood,
3. Pressure impregnation,
4. Microwave heating of green wood followed by dipping in the cold solution,
5. Transverse compression,
6. Dip treatment with exposure to ultrasonic waves,
7. Surface applications,
9. Adhesive or particleboard binder, and
9. Increasing the wet strength of paper.

These methods 1–6 can be used for impregnating wood and wood products for fire retardancy with the solutions as described in Tables 1 and 2. However, the selection of the method to be used would depend upon the wood species, thickness of the wood products, the end use of the product and the degree of fire retardancy required. The solids concentration of the impregnating solution would be dictated by the method used and the degree of fire retardancy required. The following typical examples illustrate some of these various aspects and methods.

EXAMPLE 1

Preparation of interior decorative hardwood plywood: by pressure impregnation (solids to acid ratio 1:1)

Dry birch veneers of dimensions 34" x 16" x 1/26" and dry basswood veneers of dimensions 34" x 16" x 1/16" were arranged in a copper tank lined with a polyethylene sheet. The veneers were separated with 1/26" thick birch strips and covered with the fire retardant solution containing a 1:1 mole ratio of solids to acid. The solids* content of the solution was 7.5% before the addition of the acid. The solution was made by the method as described for Table 2 above. The tank and its contents were evacuated for 30 minutes at 26 inches of Hg followed by the application of a pressure of 100 lbs./sq. inch for one hour. The veneers so treated were drained and then cured in a forced air convection oven for 2½ hours at 105° C. The total fire retardant retentions obtained were 19.3% and 30.7% of the oven-dried weight of the birch and basswood veneers respectively. These were assembled into a three ply plywood by using a urea-formaldehyde adhesive. The appearance of the plywood was not adversely affected by this treatment. The plywood panels were tested by the 8-foot tunnel furnace according to the A.S.T.M. Standard E–286–65T. A flame-spread index of 31 was obtained by this test.

EXAMPLE 2

Preparation of interior decorative hardwood plywood by pressure impregnation (solids to acid mole ratio 4:3)

Dry birch veneers of dimensions 34 inches x 16 inches x 1/26 inch and dry basswood veneers of dimensions 34 inches x 16 inches x 1/16 inch were arranged in a copper tank lined with a polyethylene sheet. The veneers were spaced with 1/26 inch thick birch veneer strips and immersed in the fire retardant solution having a solids* to acid molar ratio of 4:3. The solids* content was 10% before the addition of the acid.

---

*Dicyandiamide and melamine. Solids refers to these 2 reactants only.

The solution was made by the first method described above. Impregnation was accomplished by evacuating the treating vessel for 30 minutes at 26 inches of Hg followed by a one hour pressure period of 100 p.s.i. at room temperature. The treated veneers were cured as described in Example 1. The fire retardant retentions obtained were 19.9% and 37.5% of the oven-dried weight of the birch and basswood veneers respectively. These were assembled into 3-ply plywood by using a urea-formaldehyde adhesive in a hot press. The flame-spread index based on the average of two tests using the 8 foot tunnel according to the ASTM test method E–286–65T was 27.

EXAMPLE 3

Preparation of interior decorative hadwood plywood by soaking (solids concentration 20%)

Dry basswood veneers (13 x 4 ½ x ⅛ inch) and dry birch veneers (13 x 4 ½ x 1/26 inch) were arranged in a rectangular plastic vessel. The veneers were spaced with 1/26 inch thick birch strips and immersed in the fire retardant solution having a 1:1 mole ratio of solids* to acid. The solids content was 20% before the addition of the acid on a weight by weight basis. The veneers were allowed to soak for approximately 24 hours. Following this the samples were drained of excess solution and heated for 2.5 hours at 105° C. in a forced-air convection oven. The retentions obtained were 26.3% and 44.3% of the oven-dried weight of the birch and basswood veneers respectively. The treated veneers were assembled into a three-ply plywood by using urea adhesives. The resulting panels were conditioned in a 35% relative humidity chamber at 80° F. followed by treating in a two-foot modified Monsanto tunnel furnace. The flame-spread index relative to 5/16 inch thick red oak, taken as 100 and asbestos cement as zero, was 28.

EXAMPLE 4

Preparation of interior decorative hadwood plywood by soaking (solids concentration 10%)

The procedure followed was exactly the same as given in Example 3. The impregnating solution contained 10% solids* before the addition of the acid. The soaking time was 16 hours. The solution was made by the method described above for TABLE 2. The fire-retardant retentions obtained were 13.5% and 14.9% of the oven-dried weight of the birch and basswood veneers respectively. The treated veneers were then glued to make three-ply plywood as described in Example 1. The average flame-spread index using the modified Monsanto two foot tunnel furnace, as described in Example 3, was 55.

EXAMPLE 5

Impregnation of veneers for fire-retardancy by diffusion

In industrial practice for the manufacture of plywood, the veneers are dried after cutting from the green logs. These dry veneers are generally treated by pressure impregnation and redried before gluing. If the veneers could be impregnated while in the green state, an economic advantage would be realized by eliminating a drying operation. This can be accomplished by a diffusion process. To illustrate this point, several veneers of basswood (13 x 4½ x ⅛ inch) with an initial average moisture content of 173% and yellow birch (13 x 4½ x 1/26 inch) with an initial average moisture content of 107% were arranged in a rectangular plastic vessel. The veneers were separated by 1/26 inch thick veneer strips and immersed in the fire-retardant solution having a 1:1 mole ratio of solids* to acid. The solids* content was 15% by weight before the addition of the acid. The solution was prepared by the first typical method above. The veneers were allowed to remain in solution for 12 hours at room temperature. Following this the samples were drained and cured as described in the previous Examples. The average retentions obtained as a result of diffusion were 15.7% and 19.4% for birch and basswood veneers respectively of the oven-dried weight of the untreated veneers. There was no significant change in the aesthetic quality of the veneers treated in this manner.

EXAMPLE 6

Preparation of fire-retardant composite wood products by surface application

A solution containing 20% solids* was prepared as described for Tables 1 and 2. Then 85% phosphoric acid was added so as to obtain a solids to acid mole ratio of 1:1. This solution was applied to 3/16 inch thick three-ply factory assembled birch plywood, ½ inch three-ply Douglas fir plywood and ⅝ inch K–3 particle board by means of a brush. The coated panels were cured in one of the following ways.

(I) Heated in a forced air convection oven for two hours at 60° C.
(II) Pressed in a hot press at 107° C. and at 250 p.s.i. for one minute after drying.

All panels were conditioned in a 35% relative humidity atmosphere at 80° F. followed by testing in the two foot modified Monsanto tunnel furnace. The flame-spread indices obtained are as shown in Table 3.

TABLE 3.—FLAME SPREAD INDICES OF SURFACE-TREATED WOOD PRODUCTS

| Material description | Coverage (g./sq. ft.) | | Flame spread index |
|---|---|---|---|
| 1. 3/16 inch birch plywood | 77 | Convection drying | 20 |
| Do | 77 | Hot press | 24 |
| 2. ½ inch Douglas Fir plywood. | 73 | Convection drying | 19 |
| Do | 83 | Hot press | 33 |
| 3. 4 mm. Lauan plywood | 61 | Convection drying | 33 |
| Do | 66 | Hot press | 24 |
| 4. ⅝ inch K–3 particle board. | 61 | Convection drying | 19 |
| Do | 70 | Hot press | 32 |

All of the coated panels had an excellent clear and transparent surface finish. The fire-tested products showed up to ½ inch thick intumescence.

EXAMPLE 7

Preparation of leach-resistant fire-retardant cedar shingles

Western red cedar shingles were arranged in a pressure treating vessel by spacing them with 1/26 inch thick veneer strips. These were then covered with the fire-retardant solution having a 1:1 mole ratio of solids to acid. The solids* content was 10% before the addition of the acid on a wt./wt. basis. The solution was prepared by the first typical method above. Impregnation was achieved by evacuating the impregnating vessel and its contents for 30 minutes at 26 inches of Hg followed by a one hour pressure period of 100 p.s.i. at room temperature. The shingles so treated were drained of excess solution and cured in a convection oven for 10 hours at 60° C. followed by heating for 2 hours at 105° C. The total retentions obtained varied from 7.4% to 37.1% of the oven-dried weight of the untreated shingles. This variability in retentions is attributed to the large variation in the refractory nature of the cedar heartwood.

The treated shingles were tested in two ways for fire retardancy. These are:

I. Flame Spread Measurements Before and After Leaching

The treated shingles were divided into several groups based upon their fire-retardant retentions for evaluation. Half of the shingles from each group were subjected to the leaching action of water. The shingles to be leached were submerged in a tank of water and the water was changed at a rate of 7 litres per minute for a period of seven days. During the process of leaching, the water in the tank was continuously stirred. Before and after leaching, the shingles from each group were tested for fire-retardancy by using the two foot tunnel furnace as described previously. The results were as shown in Table 5.

TABLE 4.—COMPARISON OF FIRE-RETARDANCE OF LEACHED AND UNLEACHED SHINGLES

| Percent retention range | Flame-spread index range | | After glow (in seconds) |
|---|---|---|---|
| | Before leaching | After leaching | |
| 7–17 | 26–37 | 43–52 | 0 |
| 20–30 | 26–33 | 33–41 | 0 |
| 31–40 | 23–26 | 28–32 | 0 |

(II) Evaluation According to the Test Method ASTM E–108

The preformance of the treated shingles was determined by the three standard tests (ASTM E–108) for roof coverings, a flame-exposure test, a spread-of-flame test and a resistance-to-burning-brand test. During the flame-exposure test, no flaming occurred on either the shingle surface or the underside of the test decks. Afterglow was completely absent. Up to 3/8 inch thick intumescence was observed.

No surface or underside flaming was observed during the four minute spread-of-flame test. Afterglow of the shingle deck was completely absent as in the provious test.

In the resistance-to-burning-brand test, no flaming of the deck boards was noted during the test period. There was no ignition of the decks at all and afterglow was completely absent.

The shingles treated by this method to a retention level of about 25% were rendered sufficiently leach resistant to meet the Class "C" requirements of the Underwriter's Laboratories specifications after the "permanence-of-treatment" test. This test simulates an exposure of the treated products to 800 inches of rain and drying over a 10-year period. Before and after the "rain test" there was no significant difference in the performance of these shingles in the three standard tests i.e. spread-of-flame, flame exposure and resistance-to-burning-brands.

It has been reported that when western red cedar is treated with some of the existing methods, the treated products become dark and unsightly or give the appearance of being seriously weathered. On the other hand, western red cedar treated with this formulation shows no adverse effects with regards to appearance.

EXAMPLE 8

Decay resistance of veneers

Treated birch veneers from Example 2 and untreated control samples were cut into strips approximately 1/2 by 1 1/2 inches in size. Two different methods were used to test the fungicidal properties of the fire-retardant treated veneers to *Lenzites trabea*, a brown rot fungus which causes decay of wood in buildings and under other service conditions. These two methods were:

Agar plate method

*Lenzites trabea* inoculum was placed on the surface of a nutrient medium containing 2% malt and 2% agar at the side of petri plates 9 cm. in diameter. Four replicates were made for each of the treated and control veneers. Sterilized glass slides (1 by 3 inches) were then placed upon the agar surface in all of the petri plates.

Moisture contents of the veneer samples were adjusted to approximately 100% before placing a strip on each of the glass slides. Veneer strips were not sterilized. When *Lenzites trabea* mycelium reached the edge of the veneer, the strips were removed away from the agar inoculum on the glass slides. Fungal growth was observed for one week during the incubation period in a room maintained at 27° C. and 70% relative humidity.

Growth of *L. trabea* on the agar supporting the treated veneer samples was 25 mm. compared to 43 mm. for the control after an incubation period of 1 week. This indicates that the chemicals in the treated strips produced a fungicidal effect upon the fungus. At this incubation time the linear growth of *L. Trabea* on the untreated veneer was 20 mm. No growth was noted on the treated samples.

Test tube method

Veneer strips, of the same size as those mentioned in the preceding method were placed in test tubes (18 by 150 mm.) which contained 0.5 ml. distilled water. Some of the treated and control strips were sterilized at 15 p.s.i. for 20 minutes in an autoclave. *Lenzites trabea* inoculum, containing no nutrient medium, was placed at the top of each of the veneer strips and incubated under similar conditions as indicated in the preceding method. Non-inoculated controls were also included in the tests.

By the end of the 1 week incubation period no fungal growth was observed on either the sterilized or non-sterilized treated veneer strips placed in test tubes. All the untreated but inoculated controls supported *L. trabea* growth.

EXAMPLE 9

(1) Particle board binder

A resin solution of formulation as in Table 1A at 4 moles of acid and containing 57.3% solids (calculated as total reactants), was sprayed onto a mixture of poplar flakes from 1/30 to 1/8-inch thick and the mixture formed into a mat and pressed at 280 F. for 10 minutes to obtain a 1/2 inch particleboard at 45 lb./ft.$^3$ density. The internal bond (I.B.) strength of the particle board was about 84 p.s.i. The C.S.A. Standard 0188(68) requires a minimum I.B. value of 50 p.s.i. and most commercial particleboards of a similar type have an I.B. of about 75–80 p.s.i. The fire-retardant properties of this particleboard were good (see Table 5).

In the manufacture of fire-retardant particleboard by present-day methods, a critical problem is the adverse effect of the treating chemicals on the binding characteristics of the resin adhesive. In this Example the fire-retardant and adhesive are one and the same. This has an important advantage of being a "one-pot" system, avoiding the costly operations of impregnation and subsequent drying of chips.

(2) Plywood adhesive

The same solution as in Example 9(1) except containing 54% solids (calculated as total reactants) was thoroughly mixed with 20% of its weight of finely-milled soft winter wheat flour. Birch veneers 1/26 inch thick were spread at 150 lb./M sq. ft. of single glue line and hot-pressed to the 1/6 inch thick basswood core veneer using a platen temperature of 250° F. for 10 minutes. The plywood was then evaluated in the flame-spread index test described above. Results are given in Table 5.

TABLE 5

| Panel products | Spread | Flame-spread index (2-ft. tunnel) | Remarks |
| --- | --- | --- | --- |
| Three-ply birch plywood | 15 lbs./M. sq. ft. | 97 | The tension shear tests on the birch lap joints showed a high degree of wood failure. |
| Control plywood specimens | 0 | 100 | Do. |
| ½-in. particleboard | 15% solids on the O.D. basis | 89 | The internal bond strength of this board was 84 p.s.i. |
| Control particleboard | 0 | 100 | Do. |

These Examples 1–9 indicate that the formulations of this invention are very suitable for fire-retardant applications with wood or cellulosics on a large scale. Clear solutions prepared according to the invention have been found to have pot-lives as long as about 6–7 months or more without gelling or precipitating (many still are useful after 7 months and showing no signs of deteriorating).

Prior melamine fire-retardant formulations as described in Canadian Pat. 526,115 were compared with those of the present invention. Solutions were prepared as follows: (see Table 6).

The pairs of solutions were compared for stabilities, appearance, initial pH and free formaldehyde content (measured after 30 min.). The initial pH (at the time of preparation) was lower for the present invention (i.e. below 1.3, typically above 0.5) compared to the corresponding prior art solutions (pH about 2). Other results are summarized in Table 7.

TABLE 6

| Solution | Composition | Compounding method |
| --- | --- | --- |
| I | Corresponds to Formulation I in Canadian Pat. 526,115 (half methylolation).* | Canadian Pat. 526,115. |
| II | Same mole ratios as I but no pre-methylolation.* | Present invention. |
| III | Similar to I but altered for full methylolation, i.e. hexamethylol melamine (HMM) and dimethylol dicyandiamide (DMD). | Canadian Pat. 526,115. |
| IV | Same as III but no pre-methylolation. | Present invention. |
| V | HMM, 15.3 parts by wt.; DMD, 21.6 parts by wt.; $H_2O$, 57.6 parts by wt.; $H_3PO_4$, 23.1 parts by wt.; | Canadian Pat. 526,115. |
| VI | Similar to V but Formalin, 48.7 parts by wt.; Melamine, 6.3 parts by wt.; Dicyandiamide, 12.6 parts by wt.; $H_2O$, 27 parts by wt.; 3N NaOH, for pH adjustment. | Present invention. |

*Mole ratios outside present invention.

TABLE 7

| Solution | | Appearance | Stability | Free HCHO wt. percent of solution |
| --- | --- | --- | --- | --- |
| Prior art | Present invention | | | |
| I | | Grey-white | Poor (precipitation) | 4.2 |
| | II* | Clear | <2 weeks | 6.1 |
| III | | Grey-white | Poor (precipitation) | 5.3 |
| | IV | Clear and colorless | Good | 10.9 |
| V | | Grey-white | Poor (precipitation) | 4.8 |
| | VI | Clear and colorless | Good | 10.3 |

*Method only.

Dried resin was obtained from solutions III and V and compared to that from IV and VI by differential thermal analysis (DTA) and infra-red spectra. Striking differences in the DTA curves were observed between resins of the two groups particularly below about 300° C. The IR spectra for III and V showed a distinct peak at 2175 cm.$^{-1}$ which was absent for IV. This peak may indicate the presence of the —C≡N group. The free HCHO contents of these solutions of the present invention were about twice those for these prior art solutions. These prior art solutions and resins are significantly different from those of the present invention and most importantly have inadequate pot-life for economical large scale treatment of wood and cellulosic products.

I claim:

1. An aqueous liquid composition comprising an intermediate-stage resin solution formed by reacting (a) dicyandiamide, (b) formaldehyde, (c) melamine, and (d) oxy-acid of phosphorus within the approximate mole ratios of (a)/(c) from about 12/1 to 1/1, (a)+(c)/(d) from about 2/1 to 2/3, and (a)+(c)/(b) from about 1/2 to 1/4; which reaction comprises dissolving (a) and (c) in an aqueous solution of (b) having a pH of about 7.5 to 8.5 and temperatures of about 60 to 90° C., cooling this solution to below about 30° C. and adding (d) slowly to avoid any significant increase in solution temperature; the resin solution having present unreacted formaldehyde in initial amounts not less than about 19% wt. of total reactants, and acid in amounts sufficient to give an initial pH not significantly above about 1.5 and having a pot-life of at least about two weeks.

2. The composition of claim 1 wherein the acid of phosphorus is phosphoric.

3. The composition of claim 2 wherein the reactants are added in approximate molar ratios equivalent to

| | |
| --- | --- |
| Melamine | 1 |
| Dicyandiamide | 3 |
| Formaldehyde | 12 |
| and | |
| Phosphoric acid | 2 to 6 |

4. The composition of claim 1 wherein the reactants are present in approximate molar ratios equivalent to

| | |
| --- | --- |
| Melamine | 1 |
| Dicyandiamide | 9 |
| Formaldehyde | 30 |
| Phosphoric acid | 10 |

5. The composition of claim 1 wherein water is added to give a water content of about 21 to 90% by weight in the final solution.

References Cited

UNITED STATES PATENTS

| 2,582,961 | 1/1952 | Burnell | 260—67.6 |
| 2,628,946 | 2/1953 | Juda et al. | 260—67.6 |
| 3,372,131 | 3/1968 | Rohlfs et al. | 260—69 N |
| 3,479,211 | 11/1969 | Goldstein | 117—136 |

LORENZO B. HAYES, Primary Examiner

U.S. Cl. X.R.

260—67.6 R; 117—136, 148